No. 791,577. PATENTED JUNE 6, 1905.
E. RIVEROLL.
PROCESS OF SMELTING ORE.
APPLICATION FILED FEB. 8, 1904.
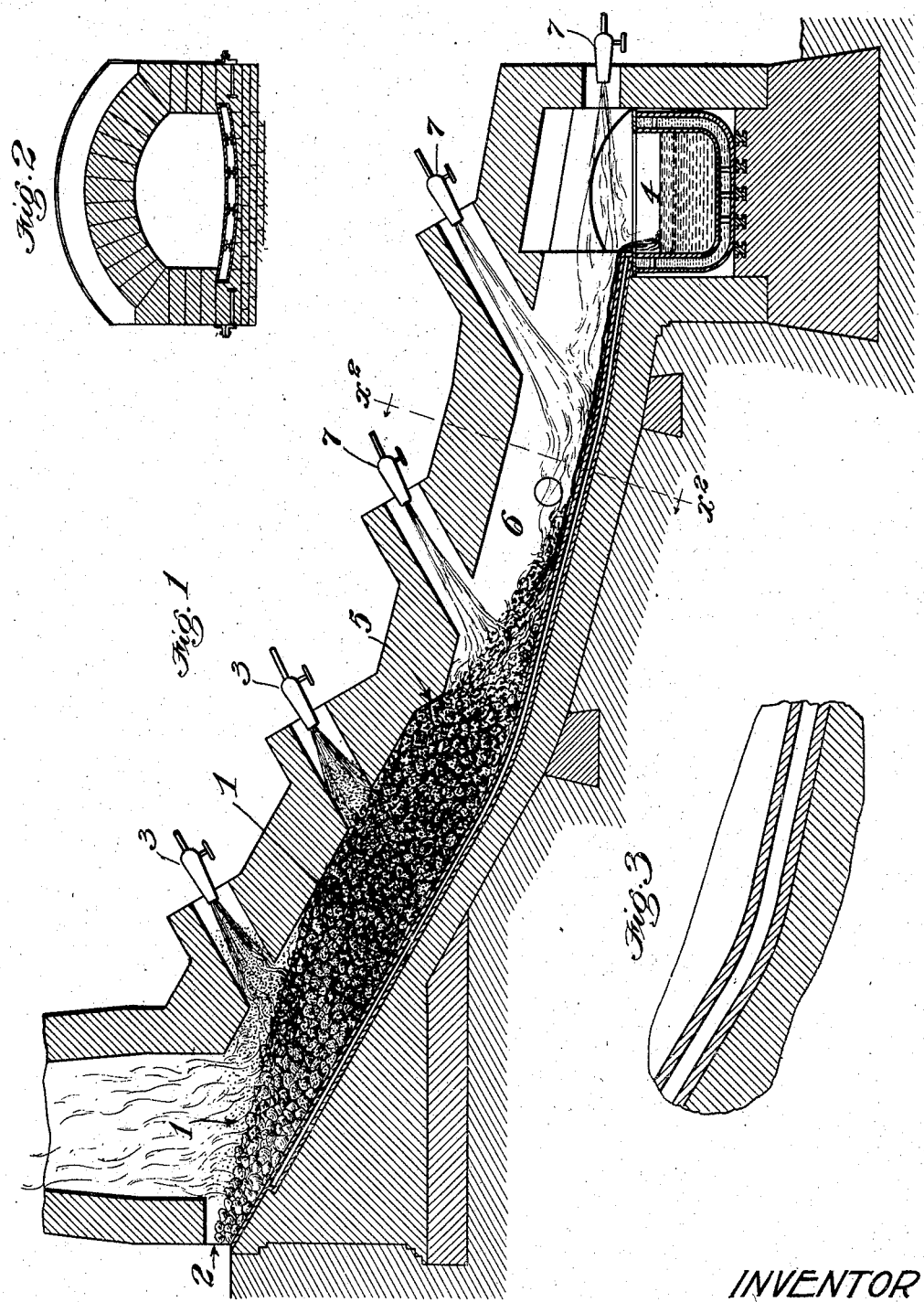
WITNESSES
INVENTOR
Elfego Riveroll
by
Townsend Bros.
attys.

No. 791,577. Patented June 6, 1905.

UNITED STATES PATENT OFFICE.

ELFEGO RIVEROLL, OF LOS ANGELES, CALIFORNIA.

PROCESS OF SMELTING ORE.

SPECIFICATION forming part of Letters Patent No. 791,577, dated June 6, 1905.

Application filed February 8, 1904. Serial No. 192,533.

*To all whom it may concern:*

Be it known that I, ELFEGO RIVEROLL, a citizen of the Republic of Mexico, residing at Los Angeles, in the county of Los Angeles and State of California, have invented a new and useful Improvement in the Process of Smelting Ore, of which the following is a specification.

This invention relates to the smelting of ores, and has for its object to render the process in a more expeditious and economical manner than heretofore.

This process consists of depositing a coating of carbon upon a charge of iron ore and limestone by exposing the same to the action of any fuel burning with insufficient oxygen to produce perfect combustion. Fuel thus burned produces a smoky flame composed of carbon dioxid plus carbon, and the free carbon in the flame is deposited on the pieces of ore and limestone in the form of soot. The ore, with carbon thus deposited, is then subjected to perfect combustion, and the resulting carbon dioxid comes in contact with the carbon deposited on the charge of ore. By this union at a considerable degree of heat carbon-monoxid gas is formed at the smelting zone, and this gas passes through the charge and robs the ore of its oxygen and leaves the furnace as carbon dioxid. The ore thus deprived of its oxygen is at the smelting zone reduced and is from there passed down into the hearth or crucible, where the earthy impurities of the ore unite with the flux, forming a slag, and the iron and slag are separated by gravity, the iron sinking to the bottom and the slag floating on the top of the iron.

Attempts have been made heretofore to smelt iron ore by using liquid fuel, which have been failures in a commercial way, as in no case more than one hundred and fifty pounds of the charge have been reduced at any one time, and, moreover, coke or charcoal has had to be introduced to the extent of ten per cent., or thereabout, in order to accomplish the necessary chemical reaction.

So far as known I am the first inventor to provide a practical process of commercial value for smelting iron ore without employing solid fuel. By securing the proper deposition of carbon with an agent the nature and application of which does not sensibly increase the bulk of the charge being treated the importance and value of the process in one aspect is at once apparent. Moreover, by comparing the material cost of this carbon-producing agent and the cost of handling it while in use with the cost of coke, coal, or charcoal and the attendant handling of it in charging the furnace the advantages of the present process financially are apparent.

In a test run of this process, using crude oil only as fuel with a specific gravity of 20.5, the iron ore showed by analysis: metallic iron, 56.7; silica and alumina, 13.3; sulfur, 1.4. The analysis of the limestone flux was: lime, 52.5; silica, 6.3. After smelting the resultant slag consisted of forty-five per cent. silica and alumina, fifty per cent. lime, and five per cent. iron and other elements.

The accompanying drawings will aid in understanding the working of the process and illustrate one type of furnace which may be employed. Furnaces of which this is a type are shown in former United States patents of mine, No. 737,487, August 25, 1903, and No. 748,561, December 29, 1903. A furnace of this type was the one used in the test run mentioned above.

Referring to the drawings, Figure 1 is a longitudinal vertical section through the furnace. Fig. 2 is a sectional view on line $x^2$ $x^2$, Fig. 1. Fig. 3 is an enlarged longitudinal vertical sectional view of a portion of the furnace at a curve in the bottom.

The ore and flux are introduced into the upper section 1 of the furnace through the charging-way 2 and slides down gradually along the floor, distributing itself along the floor and banking against a sloping abutment 5. The flames from the upper burners 3 are regulated to burn with insufficient oxygen, so that a smoky flame composed of carbon dioxid plus carbon is maintained, which deposits the free carbon in the form of soot on the ore in the upper section 1.

In the lower chamber 6 of the furnace the burners 7 are supplied with a sufficient amount of oxygen, so that perfect combustion is maintained in the lower chamber and carbon dioxid is produced, which comes in contact with the carbon which had previously been deposited on the charge while the charge was at the upper end of the furnace. By this union in the lower chamber 6 at the smelting zone of intense heat, which is just below the abutment 5, carbon-monoxid gas is formed, and this gas in passing up the furnace through the charge in the upper part robs the ore of its oxygen and leaves the furnace through the stack as carbon dioxid. The ore thus deprived of its oxygen in the upper part of the furnace passes down into the lower part and smelting zone and is melted by the white heat of perfect combustion at that point, and the ore and flux flow down into the crucible 4, when the ore settles by gravity to the bottom and the slag floats on top.

The process is continuous, and the ore works its way through the furnace, as shown. As the ore is reduced at the smelting zone it flows down the lower chamber. At the smelting zone the ore which is immediately under the intense heat will frequently fall away in a batch, and the unreduced ore will settle farther down the furnace, banking against the abutment 5. There is a regular downward movement of the ore through the furnace, and by proper feeding the process may continue indefinitely.

The abutment 5 serves to sustain the unsmelted ore, so that the intense heat cannot escape freely over the top of the ore, but attacks the mass most effectively. As the mass of ore in moving down the furnace results in the pieces of ore shifting, turning, and rearranging to suit the progress of the mass and as the gases escape by passing through the chinks between the pieces of ore forming the mass, the effective attack of the gases and uniform distribution throughout the entire mass are promoted to the utmost.

It has heretofore been proposed to smelt pure oxid of iron in a fine granular form (all foreign substances having been removed by a magnetic separation) and without flux by first highly heating the entire mass by a petroleum flame burning with its best heating-flame and then to cut down the supply of air to the same burners and produce a flame having an excess of carbon and hydrogen to withdraw the oxygen from the iron and bring the iron to a metallic state; but my process is a continuous one and treats the metalliferous rock, with whatever substances or impurities there may be associated with it, crushed into pieces of a suitable size, which, with the flux, is moved gradually through the zones of the furnace, and in the upper zone flames are maintained of a character to deposit carbon in the form of soot on the ore and in the lower or smelting zone the flames are maintained of a character to give the best smelting heat to reduce the ore. As the burners in both zones are in simultaneous action and as the ore is constantly fed through the furnace and the respective zones in order, the process is continuous. Thus the two main steps of the process are carried on simultaneously, and it is the movement of the ore through the furnace which subjects a given mass of it sequentially to the flames of different character.

I regard the process as broadly new in the deposition of carbon produced from the imperfect combustion arising from burning any fuel (solid, liquid, or gaseous) within sufficient oxygen. The employment of oil as the fuel is desirable for the reasons set forth. Thus the scope of the invention is not limited to the employment of oil at either the smelting zone or the upper part of the furnace, nor is it limited to the employment of similar fuels at the same time at all parts of the chamber.

What I claim is—

1. The process of smelting ore which consists of subjecting part of the ore to the product of an imperfect combustion, thereby depositing carbon on that ore, and at the same time subjecting that ore to a monoxid gas, and deoxidizing that ore, and at the same time subjecting a previously-deoxidized portion of the ore to a smelting heat, the monoxid gas being formed when subjecting the ore with carbon to the smelting heat.

2. The process of smelting ore which consists in passing the ore through a flame maintaining imperfect combustion from a fluid fuel and depositing carbon on said ore from said flame and then passing said heated carbon-covered ore into a flame of perfect combustion from a fluid fuel of sufficient intensity to smelt the ore.

3. The process of smelting metalliferous rock, which consists of establishing a zone in a suitable furnace in which flames of imperfect combustion are projected from a burner supplied with fluid fuel, and establishing another zone in which flames of perfect combustion are projected which produce a smelting heat, and moving the ore through the zones whereby in the first zone carbon is deposited on the ore and whereby in the second zone the ore is smelted and a monoxid gas formed, and causing the said monoxid gas to come in contact with the ore in the first zone whereby the ore in the first zone is freed of its oxygen before it enters the second zone.

4. The process of smelting metalliferous rock, which consists of establishing a zone in a suitable furnace in which flames of imperfect combustion are projected from a burner supplied with fluid fuel, and establishing another zone in which flames of perfect combustion are projected which produce a smelting heat, and moving the ore through the zones whereby in the first zone carbon is deposited on the ore and whereby in the second zone the ore is smelted and the gases arising in the second zone are passed through the ore in the first zone whereby the ore is deoxidized in the first zone before it passes to the smelting zone.

In testimony whereof I have signed my name to this specification, in the presence of two subscribing witnesses, at Los Angeles, in the county of Los Angeles and State of California, this 30th day of January, 1904.

ELFEGO RIVEROLL.

Witnesses:
GEORGE T. HACKLEY,
JULIA TOWNSEND.